A. E. PIM.
DEVICE FOR USE IN PICKING FRUIT.
APPLICATION FILED NOV. 21, 1918.

1,404,163.

Patented Jan. 17, 1922.
2 SHEETS—SHEET 1.

INVENTOR.
Arthur E. Pim,
by Wilhelm & Parker.
ATTORNEYS.

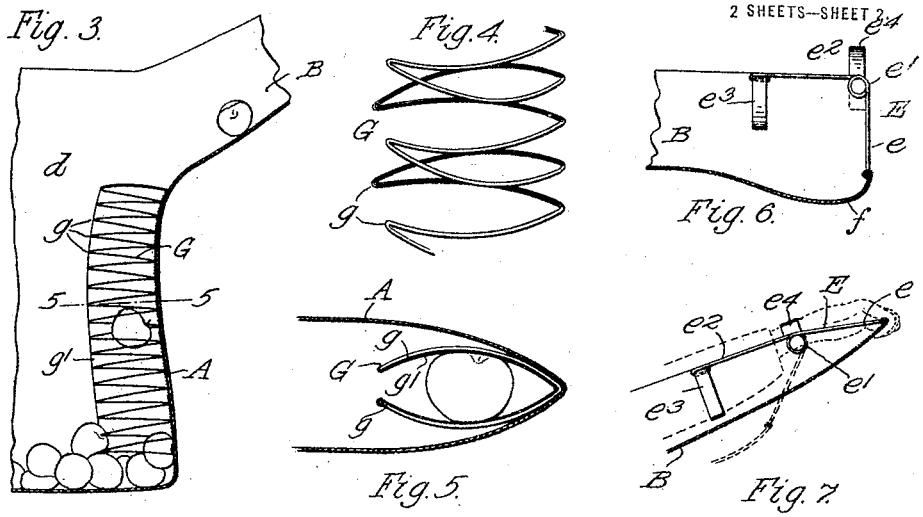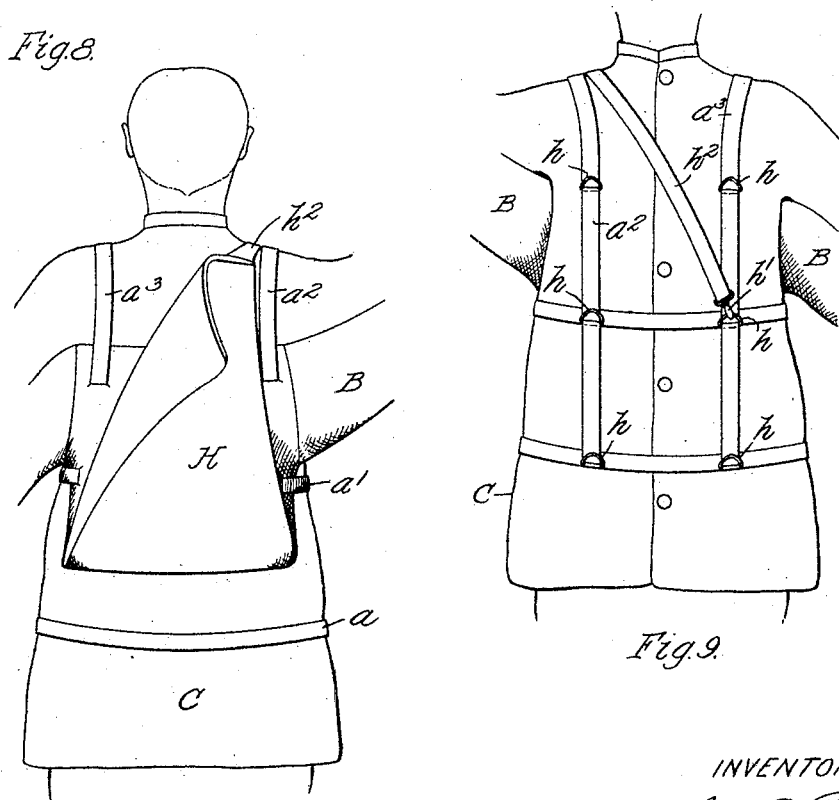

UNITED STATES PATENT OFFICE.

ARTHUR E. PIM, OF BUFFALO, NEW YORK.

DEVICE FOR USE IN PICKING FRUIT.

1,404,163. Specification of Letters Patent. Patented Jan. 17, 1922.

Application filed November 21, 1918. Serial No. 263,470.

*To all whom it may concern:*

Be it known that I, ARTHUR E. PIM, a subject of the King of Great Britain, residing at Buffalo, in the county of Erie and State of New York, have invented a new and useful Improvement in Devices for Use in Picking Fruit, of which the following is a specification.

This invention relates to devices or receptacles which are adapted to be secured to the body of a person picking fruit and which receive the fruit from the hands of the picker.

The objects of the invention are to provide a device of this kind which is so constructed that the fruit is received from the hand of the picker without necessitating the movement of the picker's arms to place the fruit into a receptacle; also to provide a device of this kind in which the fruit passes from the hands of the picker to the receptacle in such a manner as to avoid bruising or injuring the fruit; also to so construct the device that it will in no way interfere with the freedom of movement of the picker; also to provide the device with conveyer sleeves which are formed to prevent the rolling of fruit out of the conveyer sleeves when the picker's arms are substantially in a horizontal position; also to improve devices of this kind in other respects hereinafter specified.

In the accompanying drawings:

Fig. 3 is a fragmentary transverse sectional view thereof, showing the interior of the fruit receptacle and the resilient chute through which the fruit passes to the bottom of the receptacle.

Fig. 4 is a fragmentary perspective view showing a part of the chute removed from the fruit receptacle.

Fig. 5 is a fragmentary sectional plan view of the fruit receptacle on line 5—5, Fig. 3.

Fig. 6 is a fragmentary sectional view of the end of one of the conveyer sleeves.

Fig. 7 is a similar view showing the parts in different positions.

Fig. 8 is a rear view of a device of slightly modified construction.

Fig. 9 is a front view thereof.

Figure 1:
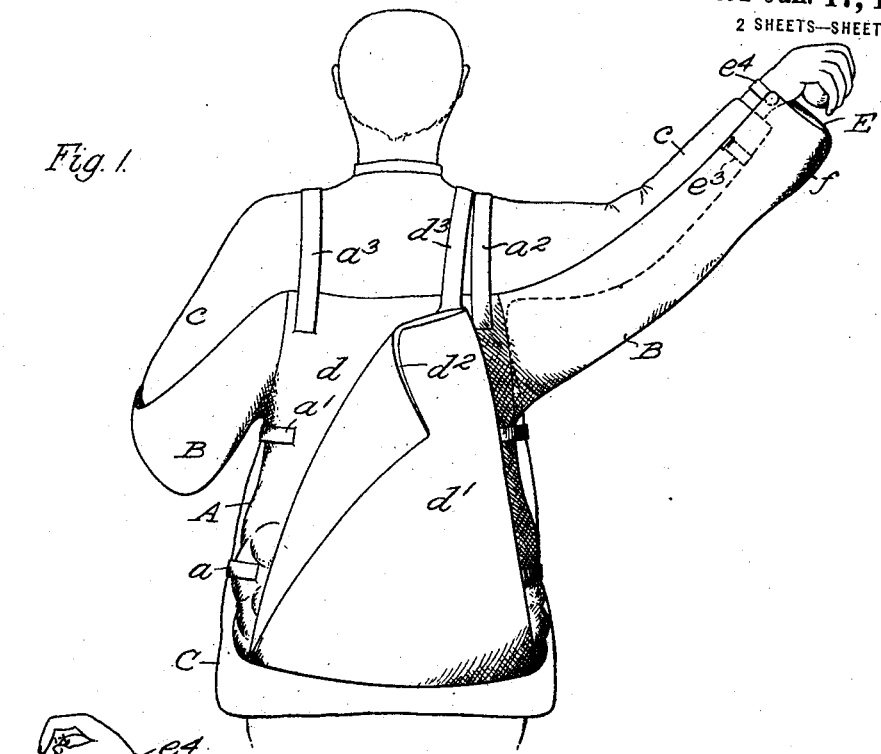
Fig. 1 is a rear view of a device embodying the invention, showing the same applied to the body of a person.

Briefly stated, the device embodying the invention shown in the drawings comprises a receptacle for the fruit which is secured in any suitable manner to the body of a person, and fruit conveyers which are arranged on the arms of the person and which have open ends, adjacent to the person's hands. The fruit placed into the open ends of the conveyers or sleeves passes into the receptacle and means are provided for preventing the bruising of the fruit due to the dropping of the fruit into the receptacle.

The device includes a fruit receptacle or bag A which is adapted to be secured to the body of the person picking the fruit, and conveyer sleeves or chutes B which are arranged to discharge fruit into the receptacle or bag and which extend along the arms of the person and are provided with open ends arranged adjacent to the hands in a position in which the fruit can be readily placed into the conveyer sleeves or chutes. The bag or receptacle may be secured to the body of a person in any desired manner, for example, by means of transverse straps $a$ $a'$ and longitudinal straps $a^2$ $a^3$ arranged to pass over the shoulders. The bag and the conveyer sleeves are preferably made of suitable textile material, which does not interfere with the freedom of movement of the person to whom the device is secured. If desired, the bag or receptacle may be sewn or otherwise secured to a jacket or coat C adapted to be worn by the person picking the fruit, and provided with sleeves $c$ to which the chutes or conveyer sleeves B are secured. By means of this arrangement the parts of the device can be securely positioned on the body of a person so that the device will not change or shift its position, but it is not essential that the device be secured to the jacket or coat C, since the receptacle and conveyer sleeves and the straps may be detached from the coat or jacket so that the device without the coat or jacket may be used in connection with the clothes ordinarily worn by the person picking the fruit.

The bag is preferably provided with a part $d$ arranged adjacent to the back of the person and with which the conveyer sleeves or chutes communicate, and a portion $d'$ which extends upwardly from the bottom of the portion $d$ and forms a continuation thereof. If the device is used in connection with the coat or jacket C, the portion $d$ of the bag is preferably sewn or otherwise secured to the jacket. The portion $d'$ has an open end $d^2$ to which a strap or band $d^3$ is preferably secured, which passes over the shoulder and is provided at its end with a snap or other fastening $d^4$ adapted to be secured to one of the longitudinal or shoulder straps $a^2$ $a^3$ for holding the open end of the bag in a position as shown in Fig. 1, to prevent the fruit from falling out of the opening $d^2$. If the receptacle or bag is to be emptied, the fastening $d^4$ is disconnected, loosening the strap $d^3$ and permitting the open end of the bag or receptacle to be lowered so that the fruit can be discharged through the opening $d^2$. By means of the construction shown, the device need not be removed from the body for discharging the fruit. Any other means for discharging the fruit from the bag or receptacle may be employed.

Figure 2:
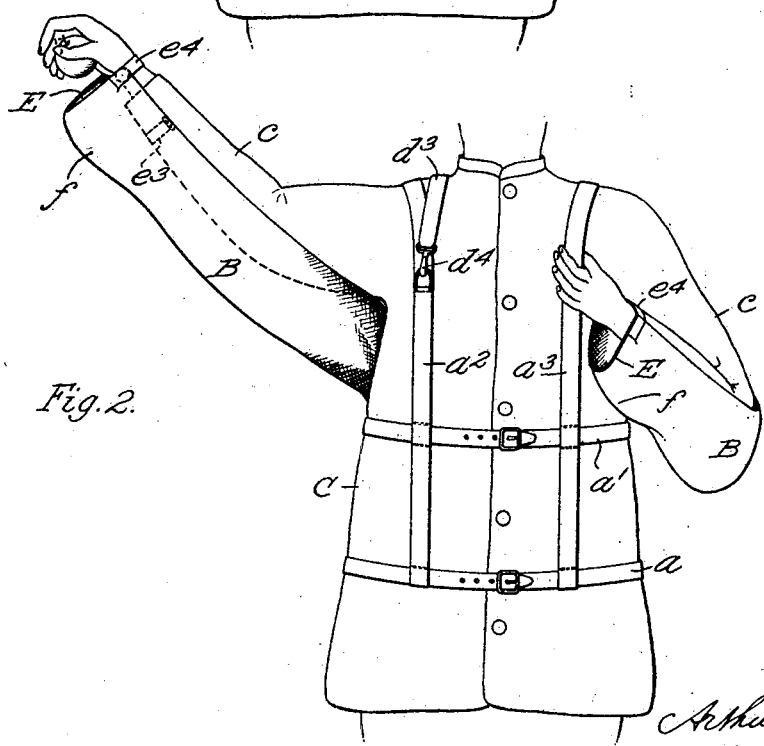
Fig. 2 is a front view thereof.

The conveyer sleeves or chutes B are preferably in the form of tubes which terminate at their inner ends in the receptacle or bag A and are fastened at their outer ends to the arms of the person. In the construction shown, the outer ends of the conveyer sleeves or chutes are provided with a wire or other stiffening member E which is bowed or bent to hold the outer end of the conveyer or chute open to receive the fruit. This wire is preferably of the form shown in Figs. 6 and 7, including a bowed portion $e$ suitably secured to the open end of the conveyer sleeve or chute, coiled or flexible intermediate portions $e'$, and end portions $e^2$ which are secured to the arm of the person by any suitable means, such, for example, as a strap $e^3$ which is secured to the ends of the portions $e^2$ of the wire and which extends partly around the arm, and a strap $e^4$ which is adapted to extend around the wrist and which is secured to the wire adjacent to the coiled portion $e'$. These two straps serve to hold the end of the conveyer sleeve or chute securely on the arm of a person. By means of the coiled or flexible portions $e'$ of the wire, the bowed portion $e$ thereof may be moved relatively to the arm of the picker as may be desired, to enable him to pass his hand between the limbs of a tree. The bowed portion may bend backwardly against the arm, as shown in dotted lines in Fig. 7, when the arm is passed through a narrow part between the limbs of a tree, or it may be seized by the hand of the person, as shown in Fig. 7, and bent in a direction in alinement with the end portions $e^2$ to enable the picker to withdraw his hand between the limbs. When no pressure is exerted on the portion $e$ of the wire, this portion will spring back to the normal position shown in Figs. 1, 2 and 6. In this position the fruit picked can be easily passed from the hand into the conveyer sleeve without necessitating the movement of the hand to the receptacle for the fruit. In order to prevent the fruit from dropping out of the conveyer sleeves or chutes when the same are substantially in a horizontal position, the outer ends of the sleeves or chutes are preferably provided with enlarged fruit-retaining portions $f$.

Means are preferably provided for preventing the bruising or damaging of the fruit when the same drops from the conveyer sleeve or chute on other fruit lying in the bag or receptacle. In the construction shown in Figs. 1–5, a retarding device G is provided for this purpose which is so arranged in the bag or receptacle as to receive fruit from the conveyer sleeve or chute. The retarding device consists of a plurality of resilient fingers arranged in two rows to form a passage through which the fruit is adapted to fall. As shown in the drawings, the retarding device is made of a single piece of wire bent to form fingers or projections $g$ which are arranged in two substantially upright rows, the inner faces of the fingers being secured to a trough-shaped strip of flexible material $g'$, such as cloth, leather or the like. The wire is so bent as to form alternately the adjacent or oppositely disposed fingers of the two rows, as shown in Fig. 4. Consequently the resiliency of the wire yieldingly holds the fingers of opposite rows in their operative positions. By means of this arrangement, fruit of different size can pass through the retarding device and will be retarded to the desired amount in each case, the smaller fruit being lighter in weight forces the spring fingers apart to a smaller degree, thus causing the same to exert less pressure on the fruit, and the larger fruit having the greater weight forces the fingers apart to a greater extent, thus causing the fingers to exert greater pressure on the fruit. The fruit can pass out of the retarding device beyond the free ends of the fingers at any portion of the device.

Other means for preventing the bruising of the fruit when falling into the bag or receptacle are shown in Figs. 8 and 9, in which the rear or open portion of the bag or receptacle H is adjustable to vary the distance from the chute or conveyer sleeve to the bottom of the bag or receptacle. This is accomplished by providing a plurality of rings or eyes $h$ on the shoulder straps of the device into which the attaching member $h'$ on the strap or band $h^2$ can be secured. When the bag or receptacle is empty, the fastening device $h'$ is secured to the lowest of the rings or eyes $h$, thus bringing the bottom of the receptacle or bag into close proximity to the discharge ends of the conveyer sleeves. As the bag or receptacle becomes filled, the fastening device $h'$ is hooked into other rings or eyes, thus permitting the bottom of the bag or receptacle to be lowered. Any other means for preventing the injuring of the fruit when dropping from the conveyer sleeve into the bag or receptacle may be employed.

Since a large part of the time used in picking fruit is spent in passing the hand from the part of the tree from which the fruit is picked to the receptacle for the fruit, it will be apparent that a great saving of time is effected by means of this device, since the hands can be used continuously for picking fruit and no time is wasted in placing the fruit into the receptacle.

The bag or receptacle is so constructed that the fruit cannot accidentally drop out and is so arranged on the picker's back as to be practically no hindrance in climbing into a tree. The picker also need not take any precaution to place the fruit properly into the receptacle, to avoid bruising the same.

I claim as my invention:

1. In a device for use in picking fruit, the combination of a receptacle for the fruit, a conveyer tube adapted to receive fruit at one end and to discharge the same to said receptacle, said tube being made of flexible material, and a yielding member secured to the receiving end of said tube and adapted to be secured to a person's arm, said yielding member being movable to different positions relatively to a person's hand and returning of its own accord to a normal fruit-receiving position.

2. In a device for use in picking fruit, the combination of a receptacle for the fruit adapted to be secured on a person's back, a conveyer sleeve adapted to be secured to the person's arm and connected at one end with said receptacle to discharge fruit into the same, and means at the other end of said sleeve for holding the sleeve open to receive fruit from a person's hand, said means including a looped portion for holding the end of the sleeve open and resilient means for normally holding the open end of the sleeve in a fruit receiving position.

3. In a device for use in picking fruit, the combination of a receptacle for the fruit, a conveyer sleeve adapted to receive fruit at one end and to discharge the same at the other end into said receptacle, and a yielding member having a bowed portion secured to the receiving end of said sleeve to hold said end open, an end portion secured to the person's arm to hold said receiving end adjacent to the person's hand, and a resilient portion between said bowed portion and said end portion.

4. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and means adapted to yieldingly press against the fruit in said receptacle for diminishing the momentum of the fruit in passing into the receptacle.

5. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and means in said receptacle adapted to yieldingly press against opposite portions of the fruit to check the momentum of the fruit for preventing the bruising of fruit dropping from said sleeve.

6. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and a plurality of resilient fingers adapted to yieldingly engage opposite sides of the fruit to check the speed of movement of the same.

7. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and a plurality of resilient fingers arranged within said receptacle in operative relation to said sleeve and between which the fruit passes from said sleeve into said receptacle to check the speed of movement of the fruit.

8. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and a plurality of resilient fingers arranged in two rows in said receptacle, the fruit passing from said sleeve between said two rows of fingers.

9. In a device for use in picking fruit, the combination of a receptacle for the fruit, a conveyer sleeve adapted to be secured to a person's arm and having an opening for the fruit adjacent to the person's hand, said sleeve discharging the fruit into said receptacle, and a piece of resilient wire bent to form a plurality of resilient fingers arranged in two rows in said receptacle, the fruit passing from said sleeve between said two rows of fingers.

Witness my hand, this 16th day of November, 1918.

ARTHUR E. PIM.

Witnesses:
F. E. PROCHNOW,
A. L. McGEE.